(12) United States Patent
Garcia

(10) Patent No.: US 6,494,035 B1
(45) Date of Patent: Dec. 17, 2002

(54) TOWING ROCKET MOTOR ASSEMBLY

(75) Inventor: Felipe Garcia, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/910,275

(22) Filed: Jul. 20, 2001

(51) Int. Cl.[7] ............................... F02K 9/08; F02K 9/26
(52) U.S. Cl. ............................ 60/253; 60/254; 60/255; 102/290
(58) Field of Search .................. 60/253, 254, 255, 60/256; 102/290

(56) References Cited

U.S. PATENT DOCUMENTS

| | | | | |
|---|---|---|---|---|
| 2,683,415 A | * | 7/1954 | Wilson | 60/256 |
| 2,937,493 A | * | 5/1960 | Adelman | 60/255 |
| 2,990,684 A | * | 7/1961 | Cohen | 60/255 |
| 3,027,709 A | * | 4/1962 | Welder | 60/255 |
| 4,017,040 A | * | 4/1977 | Dillinger et al. | 60/229 |
| 4,628,688 A | * | 12/1986 | Keirsey | 60/249 |
| 4,642,983 A | * | 2/1987 | Melvin et al. | 102/291 |
| 4,649,702 A | * | 3/1987 | Betts et al. | 60/253 |
| 6,230,626 B1 | * | 5/2001 | Kim | 60/254 |

* cited by examiner

Primary Examiner—Ted Kim
(74) Attorney, Agent, or Firm—Harvey A. Gilbert; Donald G. Peck

(57) ABSTRACT

A towing rocket motor assembly has a tubular solid propellant grain defined by exterior surface area and interior surface area. The exterior surface area is inhibited from ignition within a tubular region of a housing. The housing includes a first end and a second end at either end of the tubular region. The first end defines a plenum having an annular region defined by a diameter larger than that of the tubular region. A plurality of holes formed in the first end communicate with the annular region and are directed substantially in the direction of the second end of the housing. A burn-inhibiting baffle is fitted in the propellant grain wherein an annular spacing is defined between the baffle and the interior surface area of the propellant grain. An ignition assembly, mounted at the second end of the housing, is coupled to the interior surface area of the propellant grain so that the propellant grain burns from the inside out upon ignition. Burn gases are exhausted through the holes in the annular region of the first end of the housing.

16 Claims, 1 Drawing Sheet

TOWING ROCKET MOTOR ASSEMBLY

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to rocket motors, and more particularly to a rocket motor that can be used to tow a payload without placing launch personnel in jeopardy and without damaging the payload by means of excessive acceleration forces and burning propulsion gases.

BACKGROUND OF THE INVENTION

Rocket motors are well known in the art as a propulsion means that pushes its payload as propulsion gas exits the aft end of the rocket motor. However, some payloads must be towed to their destination for proper operation. For example, the U.S. Navy is developing a mine clearing system in which an explosive line charge array is flown/draped over an area of interest and then detonated to clear a path. As the line charge array is towed in the air to its destination, towing forces cause the array to deploy from a packed configuration. A variety of propulsion systems have been considered to date.

Conventional rocket motors are unacceptable for use as a towing propulsion system owing to the large exhaust footprint that exits the motor at ignition exhaust. The exhaust can damage or prematurely detonate the array of line charges at the launch site thereby placing launch personnel and platform in jeopardy as well as jeopardizing the mission. Further, existing rocket motors are complex, expensive, unreliable and/or unable to meet various insensitive munitions requirements.

Another possible propulsion system being considered is the mortar. However, mortars are incapable of meeting safe range stand off requirements without inducing large performance degrading G forces on the towed system components and on the launch platform.

SUMMARY OF THE INVENTION

Accordingly, it is an object of the present invention to provide a propulsion system that can be used to tow a payload.

Another object of the present invention is to provide a propulsion system that can be used to safely launch and tow an array of line charges.

Still another object of the present invention is to provide a propulsion system that is simple, inexpensive, easy to build, and meets insensitive munitions requirements.

Other objects and advantages of the present invention will become more obvious hereinafter in the specification and drawings.

In accordance with the present invention, a rocket motor assembly for towing a payload is provided. A tubular solid propellant grain is defined by exterior surface area and interior surface area. The exterior surface area is inhibited from ignition. A tubular region of a housing encases the propellant grain and the means for inhibiting ignition on the exterior surface area thereof. The housing is further defined by a first end and a second end at either end of the tubular region. The first end defines a plenum having an annular region defined by a diameter larger than that of the tubular region. The first end is provided with a plurality of holes therethrough communicating with the annular region and directed substantially in the direction of the second end of the housing. A burn-inhibiting baffle is fitted in the propellant grain wherein an annular spacing is defined between the baffle and the interior surface area of the propellant grain. An ignition assembly is mounted at the second end of the housing. The ignition assembly is coupled to the interior surface area of the propellant grain so that the propellant grain burns from the inside out upon ignition. Burn gases are exhausted through the holes in the annular region of the first end of the housing.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
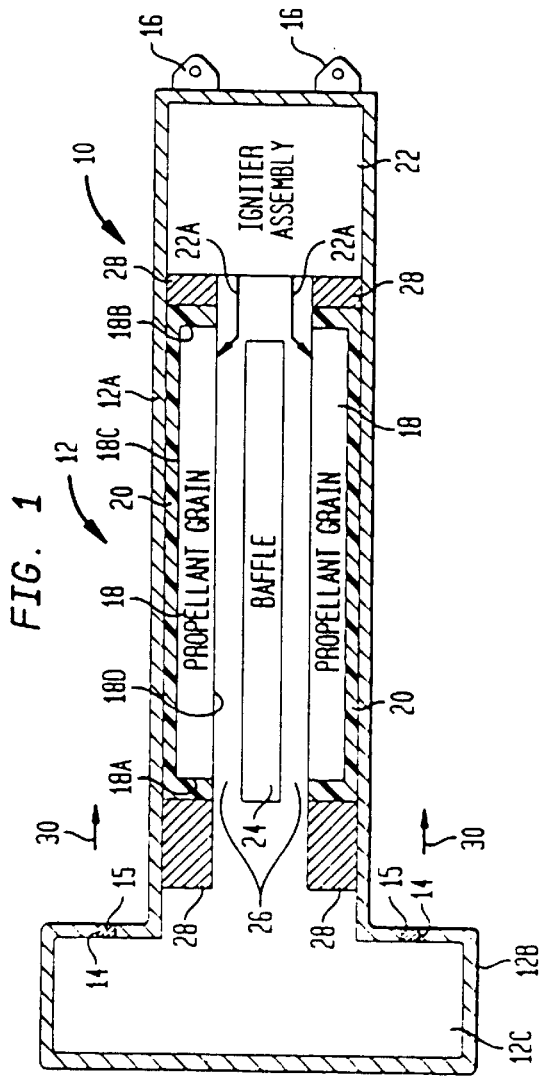
FIG. 1 is a schematic diagram of a rocket motor assembly according to the present invention.

Referring now to the drawings, and more particularly to FIG. 1, a top level schematic diagram of a rocket motor assembly for use as a towing propulsion system according to the present invention is shown and referenced generally by numeral 10. Rocket motor assembly 10 will be described for its use as a towing propulsion system for a payload such as the U.S. Navy's anti-personnel obstacle breaching system (APOBS). However, it is to be understood that the particular payload is not a limitation of the present invention.

Rocket motor assembly 10 includes a casing or housing 12 supporting the various elements of assembly 10. Housing 12 is typically a rigid material (e.g., aluminum, steel, etc.) that can withstand launch forces and the high temperatures produced during a rocket burn. Housing 12 is defined by a tubular section 12A and a plenum section 12B where plenum section 12B defines the forward end of rocket motor assembly 10. The various sections of housing 12 can be built as a single integrated structure or from multiple components coupled together without departing from the scope of the present invention. Plenum section 12B includes an annular region 12C that is larger in diameter than tubular section 12A. A plurality of holes 14 are formed in housing 12 such that holes 14 communicate with annular region 12C and are directed substantially toward the aft end of housing 12. Prior to use, holes 14 are capped or sealed by blow-out plugs 15 which are designed to fail at a given pressure within plenum section 12B as will be explained further below. Provided at the aft end of housing 12 are a plurality of tow points (e.g., rings) 16 to which a tow line would be coupled.

Mounted within tubular section 12A of housing 12 is a tubular solid propellant grain 18. Tubular grain 18 defines exterior surface area at ends 18A and 18B and the outer portion 18C thereof. Tubular grain 18 also defines interior surface area 18D along its interior portion thereof. In the present invention, the exterior surface area (i.e., ends 18A/18B and outer portion 18C) of tubular grain 18 are covered with a burn inhibiting material/structure 20 which can be realized by a single material/structure or several components. As is known in the art, such burn inhibiting materials include ethyl cellulose, phenolics, carbon fiber composites, and other moldable/extrudable/transferable high-temperature insulating materials.

Mounted in the aft end of tubular section 12A is an igniter assembly 22 having its ignition component(s) 22A coupled to interior surface area 18D of tubular grain 18 at the aft end thereof as shown. Igniter assembly 22 can be any mechanical, electronic, chemical (or combination thereof) rocket propellant ignition system and is not a limitation of the present invention. As would be understood by one of ordinary skill in the art, portions (not shown) of igniter assembly 22 may extend through and out of housing 12 depending on the type of igniter assembly used.

Fitted within tubular propellant grain 18 is a burn inhibiting baffle 24. More specifically, baffle 24 is positioned within tubular propellant grain 18 such that an annular space 26 is defined therearound between baffle 24 and grain 18. Baffle 24 prevents damage to grain 18 by helping to control and direct the burning flame propagating along grain 18 in such a way that grain 18 burns in a controlled manner from the inside to the outside once it has been ignited. Baffle 24 can be made from a variety of burn inhibiting materials, the particular choice of which is not a limitation of the present invention. Such materials include, but are not limited to, ethyl cellulose, phenolics, carbon fiber composites, and other moldable/extrudable burn inhibiting materials that interact in a controlled manner with the burning flame propagating along grain 18 in order to protect grain 18 from the flame-induced stress/strain perpendicular to baffle 24. The interaction between baffle 24 and a burning grain 18 can be a purely mechanical interaction, or it may include a chemical reaction/interaction that changes various physical conditions of baffle 24 (e.g., size and weight of the baffle) that affect baffle performance.

If pre-use handling of rocket motor assembly is a concern, it may be desirable and/or necessary to "shock mount" tubular propellant grain 18 in housing 12. For example, compression fittings 28 could be used to properly position grain 18 and apply an axial compressive force thereto. Compression fittings 28 should also be capable of absorbing shock to protect tubular propellant grain 18 from shock-induced cracks which can greatly affect a solid rocket's performance as is well known in the art.

In operation, once igniter assembly 22 has been activated, burning of tubular propellant grain 18 from the inside thereof is initiated. The burning of grain 18 causes a build up of pressure in plenum section 12B until blow-out plugs 15 are ejected from holes 14. Pressure relief through holes 14 serve as thrust directed toward the aft end of housing 12 as indicated by arrows 30. Thrust 30 propels rocket motor assembly 10 (and its towed payload attacked to tow points 16) down range.

As discussed above, thrust 30 must be generated in such a way that its exit footprint is small at launch but is sufficient to carry its payload down range. By restricting the burning of propellant grain 18 to its interior surface, the initial burning thereof will produce a small initial thrust footprint at holes 14 thereby protecting launch personnel from propellant gases. Further, a small initial acceleration is preferred so that the towed payload and/or towing assembly are not damaged by sudden G forces as is the case with mortar-based propulsion systems. This, however, translates into the need for a propellant having a burn rate that increases dramatically after initiation. A suitable solid rocket propellant that performed well in tests of the present invention is the N-5 solid rocket propellant available from, for example, Island Pyrochemical Industries, 267 East Jericho Turnpike, Mineola, N.Y.; Alliant Powder Company, Route 114, Radford, Va.; and Thiokol Propulsion, P.O. Box 707, Brigham City, Vt. Another advantage of the N-5 propellant is that it maintains its thrust performance characteristics in the broad temperature range of −25 to 125° F.

Figure 2:
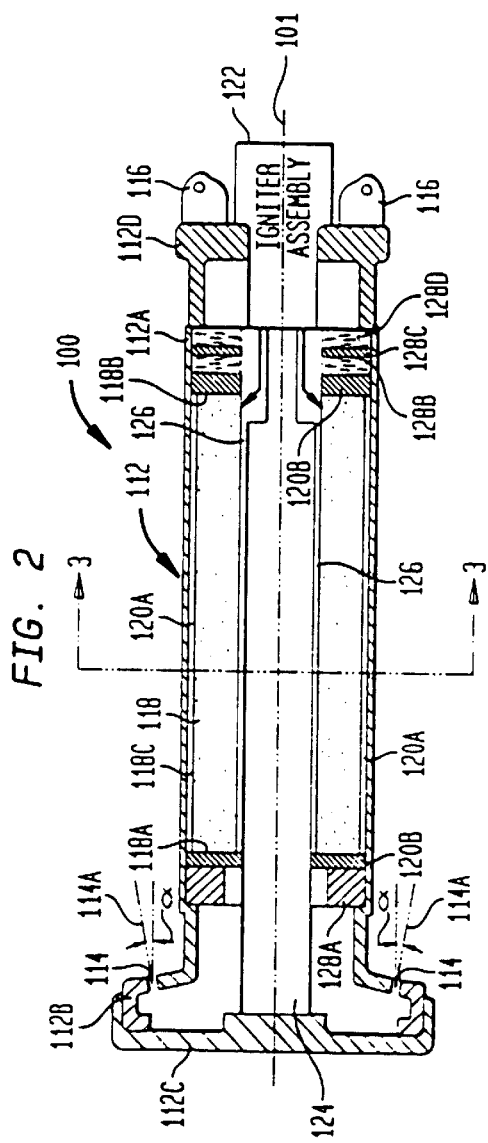
FIG. 2 is a cross-sectional view of one embodiment of the rocket motor assembly.

The principles of the present invention can be applied to a variety of specific embodiments thereof. By way of example, one such embodiment will now be described with the aid of FIGS. 2 and 3. In FIG. 2, a cross-sectional view of a rocket motor assembly built in accordance with the present invention is shown and referenced generally by numeral 100. A housing 112 has several components rigidly coupled and sealed to one another in accordance with assembly features/methods well understood in the art. For rocket motor assembly 100, housing 112 includes a tubular section 112A, a conical section 112B extending and diverging outward from the forward end of tubular section 112A, a forward end cap 112C coupled to the outboard end of conical section 112B, and an aft end cap 112D coupled to the aft end of tubular section 112A. Conical section 112B defines an annular region (i.e., analogous to annular region 12C described above with respect to FIG. 1) having a diameter larger than that of tubular section 112A. Holes 114 are formed through conical section 112B such that the center lines 114A thereof form diverging angles a with the central axis 101 of rocket motor assembly 100. While angle a can be as little as 0°, it typically is a non-zero angle so that propellant gases exiting holes 114 are directed away from tubular section 112A. Blow-out plugs (not shown in FIG. 2 for clarity of illustration) are installed in each of holes 114 prior to use. Tow points 116 are provided on or integrated with aft end cap 112D.

Mounted within tubular section 112A is a tubular solid propellant grain 118 with its ends 118A/118B and outer surface portion 118C covered with a burn inhibiting material. For example, outer surface portion 118C of propellant grain 118 can be wrapped with burn inhibiting tape 120A while ends 118A and 118B can have burn-inhibiting washers 120B butted thereagainst.

As igniter assembly 122 is mounted in aft end cap 112D. As described above, the particular design of igniter assembly 122 is not a limitation of the present invention as long as its ignition components 122A are coupled to the internal surface area of grain 118.

A burn-inhibiting baffle 124 is positioned within propellant grain 118 to define an annular space 126 therearound. In the illustrated example, baffle 124 is compressively held in place between forward end cap 112C and igniter assembly 122.

Shock mounting of propellant grain 118 is provided by components 128A–128D. More specifically, a rigid spacer block 128A defines a solid annular base for the forward end of propellant grain 118. Spacer block 128A can abut the portion of conical section 112B coupled to tubular section 112A. At the aft end of propellant grain 118, the combination of spring washers 128B and 128D sandwiched about a spacer washer 128C provide the means to apply an axial compressive force to propellant grain 118 to hold it in place while also providing shock absorption. The combination of spring washers 128B/128D and spacer washer 128C can be held in place by the portion of aft end cap 112D coupled to tubular section 112A.

Figure 3:
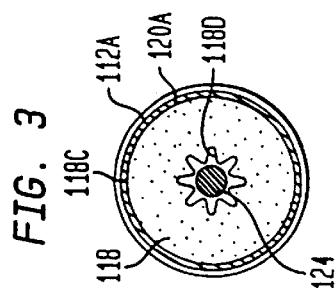
FIG. 3 is a sectional view taken along line 3—3 of FIG. 2 depicting the interior configuration of the solid propellant grain.

Referring now more particularly to FIG. 3, a cross-sectional view of rocket motor assembly 100 illustrates a diametrical view of propellant grain 118. The outer surface portion 118C of grain 118 is circular while its interior surface 118D is star-shaped to provide a greater amount of burning surface area. This feature allows grain 118 to have an accelerated burn rate even though it is restricted to burning from the inside to the outside.

The advantages of the present invention are numerous. The towing rocket assembly initially produces a small thrust footprint, but also provides an accelerated burn rate to get the rocket down range quickly. Thus, the present invention is well-suited to delivering an explosive payload that must be launched by on-site personnel and, therefore, quickly reach a safe stand-off range. The rocket motor assembly is simple to build and, as a result, will be inexpensive. Simple shock mounting of the propellant grain allows the rocket motor assembly to satisfy insensitive munitions requirements.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A rocket motor assembly comprising:
  a tubular solid propellant grain having exterior surface area and interior surface area;
  means coupled to said exterior surface area for inhibiting ignition of said propellant grain therefrom;
  a housing having a tubular region for encasing said propellant grain and said means for inhibiting, said housing further having a first end and a second end at either end of said tubular region, said first end defining a plenum having an annular region defined by a diameter larger than that of said tubular region, said first end provided with a plurality of holes therethrough communicating with said annular region connectable to outside the plenum and directed substantially in the direction of said second end;
  a burn inhibiting baffle fitted in said propellant grain wherein an annular spacing is defined between said baffle and said interior surface area of said propellant grain; and
  an igniter mounted at said second end for igniting said interior surface area of said propellant grain.

2. A rocket motor assembly as in claim 1 further comprising means for maintaining an axial compressive force on said propellant grain.

3. A rocket motor assembly as in claim 1 further comprising means for attaching at least one tow line to said second end.

4. A rocket motor assembly as in claim 1 wherein a cross-section of said propellant grain defines a circular exterior region and a star-shaped interior region.

5. A rocket motor assembly as in claim 1 wherein said propellant grain is made from an N-5 solid propellant material.

6. A rocket motor assembly as in claim 1 wherein a centerline of each of said plurality of holes forms a non-zero angle with a central longitudinal axis of said propellant grain.

7. A rocket motor assembly comprising:
  a tubular solid propellant grain having exterior surface area and interior surface area;
  means coupled to said exterior surface area for inhibiting ignition of said propellant grain therefrom;
  a tubular housing encasing said propellant grain and said means for inhibiting;
  a diverging cone coupled to one end of said tubular housing, said diverging cone having an outboard end and having a plurality of holes formed therethrough connectable to outside the cone;
  means for sealing said outboard end of said diverging cone wherein a plenum is defined within said diverging cone;
  a burn inhibiting baffle fitted in said propellant grain wherein an annular spacing is defined between said baffle and said interior surface area of said propellant grain; and
  an igniter sealingly coupled to another end of said tubular housing for igniting said interior surface area of said propellant grain.

8. A rocket motor assembly as in claim 7 further comprising means for maintaining an axial compressive force on said propellant grain.

9. A rocket motor assembly as in claim 7 further comprising means for attaching at least one tow line thereto.

10. A rocket motor assembly as in claim 7 wherein a cross-section of said propellant grain defines a circular exterior region and a star-shaped interior region.

11. A rocket motor assembly as in claim 7 wherein said propellant grain is made from an N-5 solid propellant material.

12. A rocket motor assembly comprising:
  a tubular solid propellant grain having exterior surface area and interior surface area;
  means coupled to said exterior surface area for inhibiting ignition of said propellant grain therefrom;
  a tubular housing encasing said propellant grain and said means for inhibiting;
  a diverging cone coupled to one end of said tubular housing, said diverging cone having an outboard end and having a plurality of holes formed therethrough connectable to outside the cone;
  an end cap rigidly coupled to and sealing said outboard end of said diverging cone wherein a plenum is defined within said diverging cone;
  an igniter sealingly coupled to another end of said tubular housing for igniting said interior surface area of said propellant grain; and
  a burn inhibiting baffle compressively fit between said end cap and said igniter, said baffle extending through said diverging cone and said propellant grain wherein an annular spacing is defined between said baffle and said interior surface area of said propellant grain.

13. A rocket motor assembly as in claim 12 further comprising means for maintaining an axial compressive force on said propellant grain.

14. A rocket motor assembly as in claim 12 further comprising means for attaching at least one tow line thereto.

15. A rocket motor assembly as in claim 12 wherein a cross-section of said propellant grain defines a circular exterior region and a star-shaped interior region.

16. A rocket motor assembly as in claim 12 wherein said propellant grain is made from an N-5 solid propellant material.

* * * * *